United States Patent [19]
Robinson

[11] 3,727,117
[45] Apr. 10, 1973

[54] THREE-TERMINAL CAPACITOR
[76] Inventor: Max Charles Robinson, 150 Graydon Hall Drive, Toronto, Ontario, Canada
[22] Filed: Jan. 28, 1972
[21] Appl. No.: 221,735

Related U.S. Application Data
[62] Division of Ser. No. 44,431, June 8, 1970, abandoned.

[30] Foreign Application Priority Data
June 13, 1969 Great Britain.....................29,992/69

[52] U.S. Cl. ..................317/242, 317/244, 317/247
[51] Int. Cl. ..............................................H01g 1/06
[58] Field of Search....................317/246, 261, 242, 317/244, 247

[56] References Cited
UNITED STATES PATENTS
3,253,207 5/1966 Jauch............................317/261 UX
3,292,059 12/1966 Woods...............................317/246

Primary Examiner—E. A. Goldberg
Attorney—Alan Swabey

[57] ABSTRACT

A three-terminal capacitor comprising a pair of electrodes and a pair of insulating rings separating said electrodes. A shield is connected to a third electrode formed by depositing a thin conducting film on one of the flat surfaces of at least one of the rings. The third electrode is interposed between the pair of rings whereby the electrical dimensions of the three-terminal capacitor are determined by the dimensions of the rings.

3 Claims, 1 Drawing Figure

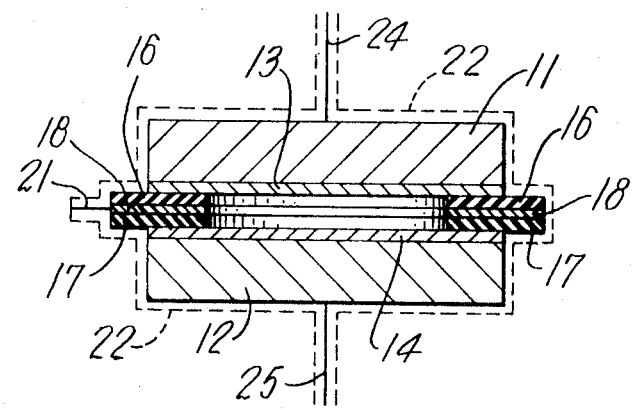

THREE-TERMINAL CAPACITOR

The present application is a divisional application of U.S. Pat. application Ser. No. 44,431, filed June 8, 1970, and abandoned on Mar. 15, 1972.

BACKGROUND OF INVENTION

1. Field of the Invention

This invention relates to three-terminal capacitors for use as reference elements or secondary standards in highly accurate measuring circuits.

2. Description of Prior Art

As the term is used in the present description of this invention, a three-terminal capacitor consists of three electrodes, one of which, the so-called third electrode, completely surrounds and shields the first two electrodes. The capacitance between these two electrodes is referred to as the direct capacitance, or simply, as the capacitance of the capacitor. The capacitances between the first two electrodes and the third electrode are referred to as stray capacitances. While the capacitance of a properly designed and constructed three-terminal capacitor is a well defined number, the stray capacitances may vary considerably since they depend on the lengths of the leads to the first two electrodes, the manner of insulating and shielding these leads and upon the stray capacitances in the remainder of the circuit incorporating said three-terminal capacitor.

In the present state of the art, the capacitance of three-terminal capacitors can be readily measured with a precision of better than 1 part per million and a sensitivity of better than 0.1 part per million. A common measuring means is some form of transformer bridge such as is discussed in detail in an article by M. C. McGregor et al. entitled "New Apparatus at the National Bureau of Standards for Absolute Capacitance Measurement" published in the IRE Transactions on Instrumentation, December 1958 and also in an article by A. F. Dunn entitled "Determination of an Absolute Scale of Capacitance" published in the Canadian Journal of Physics, Volume 42, (January 1964) pages 53 to 64. The measuring means usually include a set of one or more three-terminal capacitors used as a reference against which the unknown three-terminal capacitor is compared.

In order to be suitable for incorporation into such highly precise measuring means, it is evident that a reference three-terminal capacitor must be extremely stable. First of all it should have a very low thermal coefficient; that is, it should change very little with variations in temperature. Secondly it should exhibit little hysteresis, that is the capacitance of the reference capacitor should return to its original value after the temperature has been cycled. Thirdly, it should be mechanically stable. Fourthly, it should not change with time due to the aging of the materials from which the capacitor is constructed.

Reference three-terminal capacitors with a very low thermal coefficient are described by M. C. McGregor et al and by A. F. Dunn in the articles referred to above. These capacitors utilize two different materials, namely a copper and an aluminum alloy, whose coefficients of thermal expansion differ significantly from each other. The design is such that the effect of thermal expansion (contraction) of one of the electrodes, made from one of the alloys, is compensated for by the effect of the thermal expansion (contraction) of the other two electrodes made from the second alloy. One disadvantage of this compensation method is that it is only effective when the temperature of the electrodes are changing at the same rate, which need not necessarily be the case. Secondly, the construction is rather intricate. As well, the machining must be very accurate, since for the compensation to be effective, some of the dimensions of the different electrodes must have a definite ratio to one another depending upon the coefficients of thermal expansion of the two alloys. Thirdly, the coefficients of thermal expansion of the different alloys, which may vary somewhat from one batch to another, must be accurately and repeatedly determined. Fourthly, the components of the capacitors are subject to a variety of stresses which will tend to increase the effects of aging.

An alternative to the above described compensation method is achieved by the utilization of a special alloy, Invar, whose coefficient of thermal expansion at room temperature is much lower than that of pure metals and of other alloys. One such Invar reference capacitor has been described in U.S. Pat. No. 3,419,769 issued Dec. 31, 1968 to N. Elnekave et al. The main disadvantage of this type of capacitor is that Invar is highly unstable; that is the dimensions of an Invar object undergo sudden and irregular changes in dimension without apparent external cause. In addition Invar exhibits considerable thermal hysteresis. Thus the dimensions of an Invar object may be changed by temperature cycling even though the final and original temperatures are the same. The capacitance of an Invar capacitor would therefore be expected to change considerably with time. In support of this statement it may be noted that according to the specifications of one type of commercially available Invar reference capacitor, the drift rate may be as much as 20 parts per million per year.

SUMMARY OF INVENTION

The three-terminal reference capacitor of the present invention overcomes the disadvantages of the above-mentioned types of reference capacitors. It can be readily constructed so as to have very small coefficients of hysteresis and drift as well as a very small thermal coefficient. It is mechanically very stable, its parts require little machining, and its assembly is simple and straightforward. Finally it can be made from readily available materials such as glass or fused quartz.

BRIEF DESCRIPTION OF DRAWINGS

The invention will now be described with reference to a preferred embodiment as illustrated by the accompanying drawing which is a transverse cross-sectional view of the three-terminal capacitor.

DESCRIPTION OF PREFERRED EMBODIMENTS

Referring to the drawing, the capacitor is shown as being formed by a pair of electrodes 11 and 12 which preferably are plated slabs, plated as indicated at 13 and 14, respectively, with a thin film of a chemically inert conducting material such as gold and separated by a pair of stacked rings 16 and 17 of an insulating material such as quartz which has a very low coefficient of thermal expansion (about 0.5 ppm/°C). A thin annular conducting film 18 is deposited onto one of the flat surfaces of one or both of the rings 16 and 17 and two flat surfaces of the rings are then pressed together with the film or films therebetween and the films are connected to the shield 22 by an electric lead 21. The annular ring 18, the lead 21, and the shield 22 form the third electrode. The other two electrodes are formed by the plated slab 11 and 13 and the plated slab 12 and 14. The conventional leads 24 and 25 to the first two electrodes are completely shielded from each other by the third electrode 18, 21 and 22. If the slabs 11 and 12 are of a non-conducting material such as quartz, a conducting path is provided between the thin film 13 and the lead 24 and the thin film 14 and the lead 25.

The distance between the electrode 11 and 13 and the electrode 12 and 14 is equal to combined thickness of the rings 16 17 and the thin annular film 18 therebetween and the effective area is fixed by the inner area of the rings. Thus, the electrical dimensions of the capacitor are for all practical purposes determined by the rings. It follows that the hysteresis, drift, and thermal coefficient of the capacitor are determined by the hysteresis, drift, and thermal coefficient of the dimensions of the rings. These rings may be made of an insulator such as quartz noted for its high stability with respect to time and temperature changes. On the other hand the capacitance is independent of the dielectric constant of the rings inasmuch as the lines of force between the first two electrodes do not pass through these rings.

Neglecting edge effects, the capacitance of a parallel plate capacitor is given by $$C = 8.85 \, A/d$$

where $d$ is the distance between the plates in meters, $A$ is the area in meters squared, and $C$ is the capacitance in picofarads. Thus, if $d = 1$ mm, and the inner diameter is 12 mm, $C = 1$ pf. By varying the dimensions of the quartz rings and by stacking and connecting in parallel the individual units, one can build capacitors with values ranging from $10^{-5}$ pf or less, to $10^3$ pf or more.

The interior of the capacitor may be either evacuated or filled with an inert gas after which the rings and slabs are hermetically cemented together, for example with a glue based on epoxy resins. The capacitor is held firmly in the interior of a sealed metallic can which forms part of the electrical shield and provides mechanical protection. Two openings are provided in the can through which the shielded leads 24 and 25 are brought out. The space between the capacitor and the can may be filled with a material such as powder or foam rubber to provide additional mechanical protection and thermal insulation.

In order to avoid stresses due to differential thermal expansion, the slabs and the rings separating these slabs are preferably of the same material, quartz for example. If, however, the capacitor is to be subjected to only small temperature fluctuations then the slabs and rings can be of different materials. For example in order to reduce cost of materials, the slabs can be of glass or of a metal such as brass or iron. In the latter case the function of the plating, by gold for example, is to prevent the formation of oxide films on the electrodes which would increase the dissipation factor of the capacitor.

From the above description and from FIG. 1, it should be evident that the construction of the three-terminal capacitor of the present invention is extremely simple. Assembly consists merely of stacking the slabs and rings, one on top of the other, cementing them together and attaching the leads. Machining is limited to cutting out the slabs and rings, and to drilling and grinding the latter.

While the capacitance depends on the inner diameter and the thickness of the rings and tolerances of these dimensions can be relatively large. It is preferable to design the capacitor to be approximately 1% less than the nominal value. The remaining capacitance is provided by a small adjustable three-terminal capacitor connected in parallel to the main capacitor. Any reasonable design will do for the smaller capacitor since its stability can be less than that of the main capacitor by a factor of about 100 without producing any significant effect.

Having broadly described the present invention, modifications will be evident to those skilled in the art without departing from the spirit of the invention as defined in the appended claims.

I claim:

1. A three-terminal capacitor comprising a pair of electrodes, a pair of insulating rings separating said electrodes, a shield connected to a third electrode formed by depositing a thin conducting film on one of the flat surfaces of at least one of said rings, said third electrode being interposed between said pair of rings whereby the electrical dimensions of said three-terminal capacitor are determined by the dimensions of said rings.

2. A capacitor as defined in claim 1 wherein said rings are formed of quartz.

3. A capacitor as defined in claim 1 wherein said electrodes are formed by thin conducting films deposited onto slabs.

* * * * *